(12) United States Patent
Alvarez Canizares et al.

(10) Patent No.: US 11,081,122 B2
(45) Date of Patent: Aug. 3, 2021

(54) METHOD FOR CODING BY RANDOM ACOUSTIC SIGNALS AND ASSOCIATED TRANSMISSION METHOD

(71) Applicant: COPSONIC, Montauban (FR)

(72) Inventors: David Alvarez Canizares, Havana (CU); Victor Manuel Mendez Fonseca, Havana (CU)

(73) Assignee: COPSONIC, Montauban (FR)

( * ) Notice: Subject to any disclaimer, the term of this patent is extended or adjusted under 35 U.S.C. 154(b) by 95 days.

(21) Appl. No.: 16/309,151

(22) PCT Filed: Jun. 13, 2017

(86) PCT No.: PCT/FR2017/051517
§ 371 (c)(1),
(2) Date: Dec. 12, 2018

(87) PCT Pub. No.: WO2017/216470
PCT Pub. Date: Dec. 21, 2017

(65) Prior Publication Data
US 2019/0189141 A1 Jun. 20, 2019

(30) Foreign Application Priority Data
Jun. 13, 2016 (FR) ...................... 16 55443

(51) Int. Cl.
*G10L 19/04* (2013.01)
*G06F 7/58* (2006.01)
*H04L 9/00* (2006.01)
*H04B 11/00* (2006.01)

(52) U.S. Cl.
CPC .............. *G10L 19/04* (2013.01); *G06F 7/588* (2013.01); *H04B 11/00* (2013.01); *H04L 9/001* (2013.01)

(58) Field of Classification Search
None
See application file for complete search history.

(56) References Cited

U.S. PATENT DOCUMENTS

| | | | |
|---|---|---|---|
| 6,751,303 B1 | 6/2004 | Cook | |
| 2004/0081078 A1 | 4/2004 | McKnight et al. | |
| 2004/0105344 A1* | 6/2004 | Davies .................. | H04L 27/103 367/134 |

(Continued)

OTHER PUBLICATIONS

Nievena Lazic et al., "Communication Over an Acoustic Channel Using Data Hiding Techniques," IEEE Transactions on Multimedia, 2006, pp. 918-924, vol. 8, IEEE.

(Continued)

*Primary Examiner* — Antim G Shah
(74) *Attorney, Agent, or Firm* — Pearne & Gordon LLP

(57) ABSTRACT

The invention relates to a method for coding information symbols of an alphabet into random acoustic signals. The coding dictionary is constructed in a heuristic manner by acquiring a set of random signals, by filtering same by way of the equivalent filter of the transmission channel, by selecting subsets of these signals, and, for each subset, by calculating the correlation matrix of the selected signals, the coding dictionary being constituted by the subset for which the correlation matrix most closely resembles a diagonal matrix. The invention also relates to a method for transmitting and receiving information symbols by way of acoustic signals.

13 Claims, 4 Drawing Sheets

(56) References Cited

U.S. PATENT DOCUMENTS

2004/0158592 A1* 8/2004 Nikitin ..................... G06T 5/20
708/400
2009/0125308 A1* 5/2009 Ambler .................. G10L 15/26
704/254

OTHER PUBLICATIONS

Darko Kirovski et al., "Spread-Spectrum Watermarking of Audio Signals," IEEE Transactions on Signal Processing, 2003, pp. 1020-1033, vol. 51, IEEE.
Ying Zhang et al., "Channel Capacity Analysis of the Generalized Spread Spectrum Watermarking in Audio Signals," IEEE Signal Processing Letters, 2015, pp. 519-523, vol. 22, IEEE.
International Search Report and Written Opinion for International Application No. PCT/FR2017/051517, dated Oct. 13, 2017.
Preliminary Search Report for French Patent Application No. 16 55443, dated Mar. 23, 2017.

* cited by examiner

METHOD FOR CODING BY RANDOM ACOUSTIC SIGNALS AND ASSOCIATED TRANSMISSION METHOD

TECHNICAL FIELD

Generally speaking, the present invention relates to the field of coding and that of communication by acoustic, sonic, infrasonic or ultrasonic signals.

PRIOR ART

The coding of information by acoustic signals has been widely used in the context of data transmission, notably on a voice channel of a fixed telephony system. For example, it is well known to transmit alphanumerical data by means of DTMF (Dual Tone Multi Frequency) codes, each alphanumerical character corresponding to a pair of audible frequencies transmitted simultaneously on the voice channel. A description of a method for DTMF coding may be found in the U.S. Pat. No. 6,751,303. This DTMF coding may moreover be preceded by an error correction coding (channel coding) as proposed in the patent application US-A-2004/0081078.

The DTMF coding method does not however offer any protection against attacks of a third party that could try to intercept the transmitted messages. A first solution to guarantee the confidentiality and the integrity of messages transmitted on the voice channel would be to cipher the messages by means of a ciphering algorithm with private key or with public key, then to transmit the symbols of the messages thereby ciphered by means of DTMF codes. On reception, the symbols of the messages thereby ciphered could then be obtained from a battery of filters centred on the DTMF frequencies and the message in clear would be restored by a deciphering algorithm.

However, ciphering/deciphering algorithms are complex to implement, particularly given that the ciphering keys used are long to guard against cryptanalysis attacks.

The aim of the present invention is consequently to propose a method for coding by means of acoustic signals which guarantees a good level of confidentiality of the transmitted messages, while being particularly simple and robust.

DESCRIPTION OF THE INVENTION

The present invention is defined by a method for coding information symbols belonging to an alphabet (A) by means of acoustic signals, characterised in that:

(a) a set of random signals is acquired and they are filtered by means of a filter of interest;

(b) sub-sets ($S_N$) of N signals of said set are selected and, for each sub-set, a correlation matrix of the signals thereby selected is calculated;

(c) the sub-set of N signals corresponding to the correlation matrix the closest to a diagonal matrix is retained as coding dictionary;

(d) each information symbol of the alphabet is coded by a random signal of the dictionary, said random signal of the dictionary being transformed into an acoustic signal by means of a transducer.

Advantageously, said random signals are acquired by means of a random generator using a physical phenomenon.

Preferably, at step (c):

(c1) a new random signal belonging to said set is successively substituted by one of the random signals ($\bar{s}_i, \hat{s}_i$) of a first selected sub-set of signals;

(c2) the correlation matrix ($C_{i \to k}, C'_{i \to k}$) of the random signals is calculated for each of the sub-sets thereby substituted and a quality factor ($Q_{i \to k}, Q'_{i \to k}$) characterising the proximity of the correlation matrix to a diagonal matrix is deduced therefrom;

the steps (c1) and (c2) being repeated as long as the random signals of said set have not been exhausted and/or the quality factor is below a predetermined threshold value ($Q_{Th}, Q'_{Th}$).

According to a first embodiment, prior to step (b), from each random signal is subtracted its average so that said random signals are centred.

The quality factor may be calculated by means of $$Q' = \frac{\min_i(|C'_{ii}|)}{\max_{\substack{i,j \\ i \neq j}}(|C'_{ij}|)} \text{ or } Q' = \min_i \left( \frac{|C'_{ii}|}{\max_{j \neq i}(|C'_{ij}|)} \right)$$

or instead $$Q' = \frac{\moy_i(|C'_{ii}|)}{\moy_{\substack{i,j \\ i \neq j}}(|C'_{ij}|)}$$

where the coefficients $C'_{ij}$ are the elements of the correlation matrix and where min, max and moy signify respectively the minimum value, the maximum value and the average value.

According to a second embodiment, prior to step (b), the energy of the centred random signals is normalized so as to obtain normalized random signals all having a same average energy per sample ($E_0$).

The quality factor may be calculated by means of $$Q = \frac{E_0}{\max_{\substack{i,j \\ i \neq j}}(|C_{ij}|)} \text{ or } Q = \frac{E_0}{\moy_{\substack{i,j \\ i \neq j}}(|C_{ij}|)}$$

or instead $$Q = \frac{E_0}{\sum_{\substack{i,j \\ i \neq j}} |C_{ij}|}$$

where the coefficients $C_{ij}$ are the elements of the correlation matrix and $E_0$ is said average energy per sample of the random signals, where min, max and moy signify respectively the minimum value, the maximum value and the average value.

The invention further relates to a method for transmitting information symbols belonging to an alphabet (A) by means of acoustic signals, in which said symbols are coded by means of the coding method defined previously, the acoustic signals corresponding to successive information symbols being transmitted sequentially on the transmission channel.

Alternatively, the acoustic signals corresponding to different information symbols may be transmitted simultaneously on the transmission channel.

In all cases, it is possible to carry out a channel coding of blocks of said symbols prior to their coding by acoustic signals.

The invention finally relates to a method for receiving information symbols, in which the acoustic signal received during a symbol time is transformed into an electrical signal by a transducer, then correlated with each of the random signals of the coding dictionary to provide a plurality of correlation results, the highest correlation result in absolute value providing the index of a symbol received during said symbol time.

Alternatively, the acoustic signal received during a symbol time is transformed into an electrical signal by a transducer, then correlated with each of the random signals of the coding dictionary to provide a plurality of correlation results, the correlation results above, in absolute value, a predetermined threshold value providing the indices of the symbols received during said symbol time.

Optionally, the acoustic signal received during a symbol time is transformed into an electrical signal by a transducer, then correlated with each of the random signals of the coding dictionary to provide a plurality of correlation results, the correlation results above, in absolute value, a predetermined threshold value providing the indices of the symbols received during said symbol time, the blocks of symbols received being then subjected to a channel decoding.

BRIEF DESCRIPTION OF THE DRAWINGS

Other characteristics and advantages of the invention will become clear from reading preferential embodiments of the invention made with reference to the appended figures, among which.

DETAILED DESCRIPTION OF PARTICULAR EMBODIMENTS

A system for transmitting/receiving on an acoustic channel will be considered hereafter. Acoustic channel is taken to mean a channel for propagating a sonic wave (in the domain of audible frequencies 20 Hz-20 kHz), or even an ultrasonic wave (that is to say of frequency greater than 20 kHz) or an infrasonic wave (that is to say of frequency less than 20 Hz).

The message to code, and if need be to transmit, is constituted of information symbols belonging to a predetermined alphabet. This alphabet is constituted for example of a set of words of n bits, where n>1. Generally speaking, for an alphabet A of cardinal N, it is always possible to come down to a set of binary words of size $n=\lceil \log_2(N) \rceil$.

The basic idea of the invention is to construct in a heuristic manner a coding of the symbols of the alphabet A by random acoustic signals. More specifically, in assuming that a set S of cardinal M>>N of random signals is generated, the basic idea of the invention is to select a sub-set $S_A \subset S$ of these M random signals, respecting a certain quality criterion, and to associate in a one-to-one manner with each symbol of the alphabet A one of the random signals thereby selected. The injection of A into S thereby obtained then defines a coding by random signals which are next reproduced by an electroacoustic transducer, hence the qualification of random acoustic coding.

Figure 1:
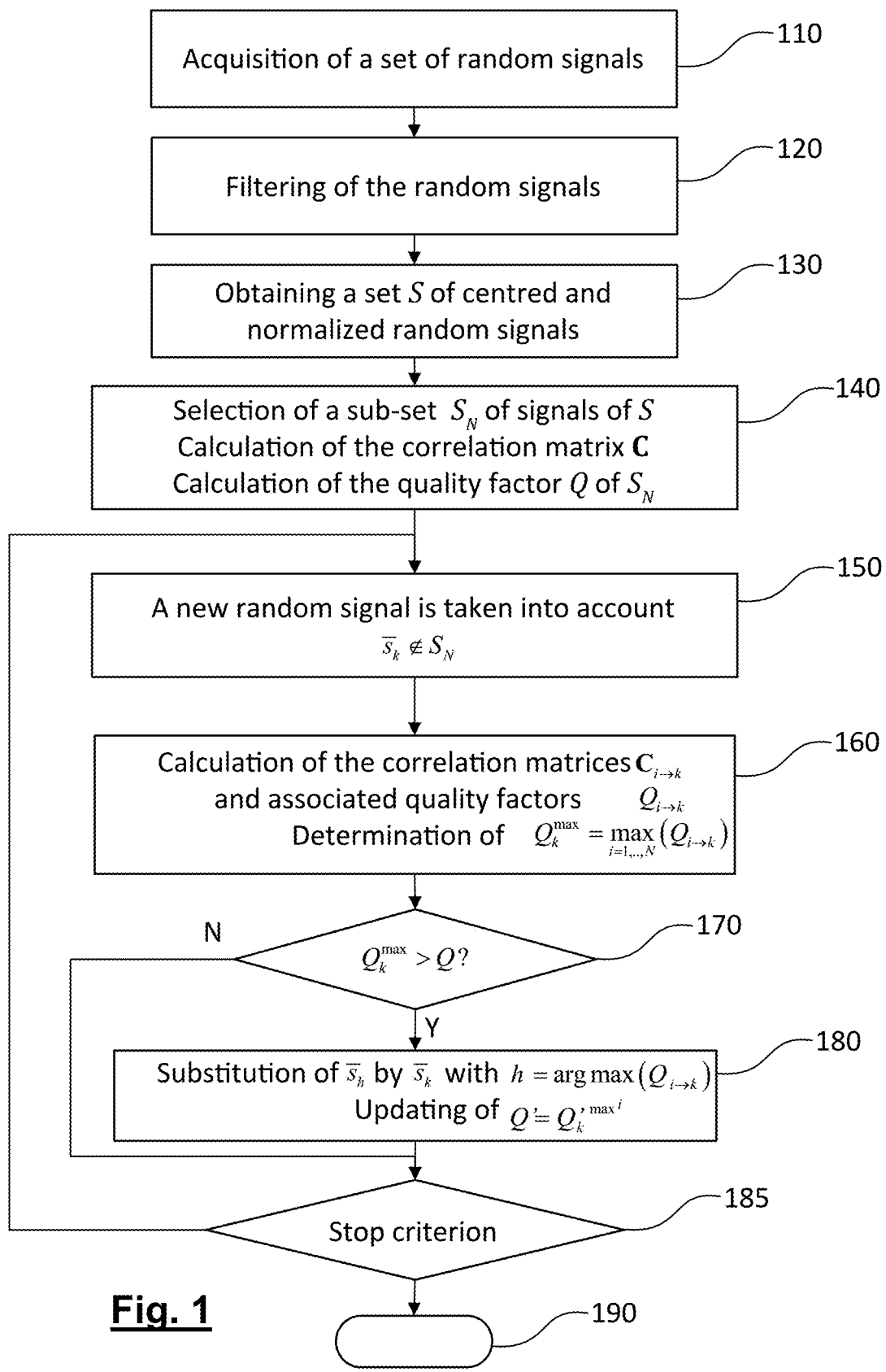
FIG. 1 schematically represents a method for constructing a coding dictionary by means of random acoustic signals according to a first embodiment of the invention.

FIG. 1 schematically represents a method for constructing a coding dictionary by means of random acoustic signals, according to a first embodiment of the invention.

According to a first alternative, the construction of the coding dictionary (or codebook) is carried out in a sequential manner, by successive iterations. Alternatively, the construction of the coding dictionary could be carried out in a parallel manner as explained hereafter.

At step 110, a set of random acoustic signals is acquired. These signals have been obtained for example by means of a random generator using a physical phenomenon such as thermal noise at the terminals of a resistance or the ground noise of a microphone. These signals are acquired by means of an acquisition chain having a predetermined passband then sampled at the corresponding Nyquist frequency. Alternatively, the random signals may have been obtained by a pseudo-random generator, advantageously chosen of cryptographic quality. Hereafter, it is explicitly understood that the expression "random signals" covers these two alternatives. Whatever the case, each random signal is thereby constituted of L samples, and stored in a memory.

At step 120, the random signals are optionally filtered with a filter having a size of interest, for example a filter having for response the response of the transmission channel. The response of the transmission channel is constituted by the convolution of the response of the amplification chain, the response of the transmission transducer (loudspeaker, piezoelectric transducer or other), the response of the propagation channel, the response of the reception transducer (microphone, piezoelectric transducer or other) and finally the response of the reception chain.

At step 130, each of the random signals is centred and normalized, if need be filtered at step 120, so as to obtain a set S of centred random acoustic signals of same energy E. More specifically, if $s_i=(s_i(1), \ldots s_i(L))$ denotes a random acoustic signal generated previously, the corresponding centralised and normalized signal is given by $\bar{s}_i (\bar{s}_i(1), \ldots \bar{s}_i(L))$ with:

$$\bar{s}_i(\ell) = \frac{\sqrt{E_0}}{\sqrt{\sum_{\ell=1}^{L}(s_i(\ell)-\mu s_i)^2}} (s_i(\ell) - \mu s_i) \quad (1)$$

where $$\mu s_i = \frac{1}{L}\sum_{\ell=1}^{L} s_i(\ell)$$

is the average of the signal $s_i$ and $E_0=E/L$ is the average energy per sample of the random signals.

At step 140, a sub-set $S_N$ of S is arbitrarily selected constituted of N centred and normalized random signals $\bar{s}_i$, i=1, ..., N and the correlation matrix of these signals is calculated. The correlation matrix is a symmetrical matrix of size N×N of which the elements are the correlation coefficients:

$$C_{ij} = \sum_{\ell=1}^{L} \bar{s}_i(\ell)\bar{s}_j(\ell) \quad (2)$$

and of which the diagonal elements are all equal to $E_0$.

Hereafter, the quality factor of the correlation matrix, or in an equivalent manner the quality factor of the set $S_N$, will be called the value:

$$Q = \frac{E_0}{\max_{\substack{i,j \\ i \neq j}}(|C_{ij}|)} \quad (3)$$

or, alternatively:

$$Q = \frac{E_0}{moy_{\substack{i,j \\ i \neq j}}(|C_{ij}|)} \quad (4)$$

where $$moy_{\substack{i,j \\ i \neq j}}(|C_{ij}|) = \frac{2}{N(N-1)} \sum_{\substack{i,j=1,...,N \\ i<j}} |C_{ij}|$$

is the average of the absolute values of the out-of-diagonal elements of the correlation matrix (taking into account that the matrix is symmetrical).

Again alternatively, the quality factor may be defined by:

$$Q = \frac{E_0}{\sum_{\substack{i,j \\ i \neq j}} |C_{ij}|} \quad (5)$$

Generally speaking, the correlation matrix C is characterised by a quality factor Q translating its proximity to a diagonal matrix, the quality factor being all the higher when the non-diagonal elements of the matrix are lower compared to the diagonal elements.

An iterative loop is next entered into at 150.

At step 150, a new centred and normalized random signal $\bar{s}_k$ of $S_i$ not yet considered, is taken into account, consequently $\bar{s}_k \notin S_N$.

At step 160, the correlation matrices $C_{i \rightarrow k}$, i=1, ..., N, of size N×N, of the random signals $\bar{s}_1, ..., \bar{s}_{i-1}, \bar{s}_k, \bar{s}_{i+1}, ..., \bar{s}_N$ are calculated. In other words, each of the N signals of $S_N$ is successively substituted by the signal $\bar{s}_k$ and each time the correlation matrix of the signals is calculated after this substitution.

It will be noted that the calculation of the matrix $C_{i \rightarrow k}$ only requires the calculation of N−1 correlation coefficients according to the expression (2) namely the signal $\bar{s}_k$ with the signals $\bar{s}_1, ..., \bar{s}_{i-1}, \bar{s}_{i+1}, ..., \bar{s}_N$, the other coefficients having been calculated previously.

The quality factor $Q_{i \rightarrow k}$ for each of the matrices $C_{i \rightarrow k}$, i=1, ..., N is next determined, according to one of the expressions (3) to (5) and the following is deduced therefrom:

$$Q_k^{max} = \max_{i=1,...,N}(Q_{i \rightarrow k}) \quad (6)$$

At 170, a test is done to determine if $Q_k^{max}$ is above the value Q, in other words if a substitutions $\bar{s}_i$ by $\bar{s}_k$ exists making it possible to improve the quality factor of the set $S_N$. If not, one passes to step 185 to test a stop criterion. If so, one passes to step 180.

At step 180, in the set $S_N$, the signal $\bar{s}_h$ with h=arg max $(Q_{i \rightarrow k})$ is substituted by the signal $\bar{s}_k$ and the quality factor is updated: $Q=Q_k^{max}$.

At step 185, a stop criterion is tested. If the stop criterion is satisfactory, the construction of the code ends at 190. Failing this, a new random acoustic signal is taken into account at 150.

A first stop criterion may be the exhaustion of the set S.

Alternatively or cumulatively, a second stop criterion may be obtaining a quality factor above a predetermined threshold value $Q_{Th}$.

The loop 150-185 is repeated as long as the signals of S (first stop criterion) have not been exhausted or a quality factor above the threshold value (second stop criterion) obtained.

Thus, a set $S_N$ of random acoustic signals having a low level of correlation with each other is progressively constructed.

Instead of proceeding in an iterative manner, it is possible to proceed in a parallel manner. In this case, all the possible combinations of N random signals of S are at once considered and the quality factor of their correlation matrix is calculated for each of these combinations. Finally the combination leading to the highest quality factor is selected. The resulting set $S_N$ of random signals constitutes the coding dictionary.

Figure 2:
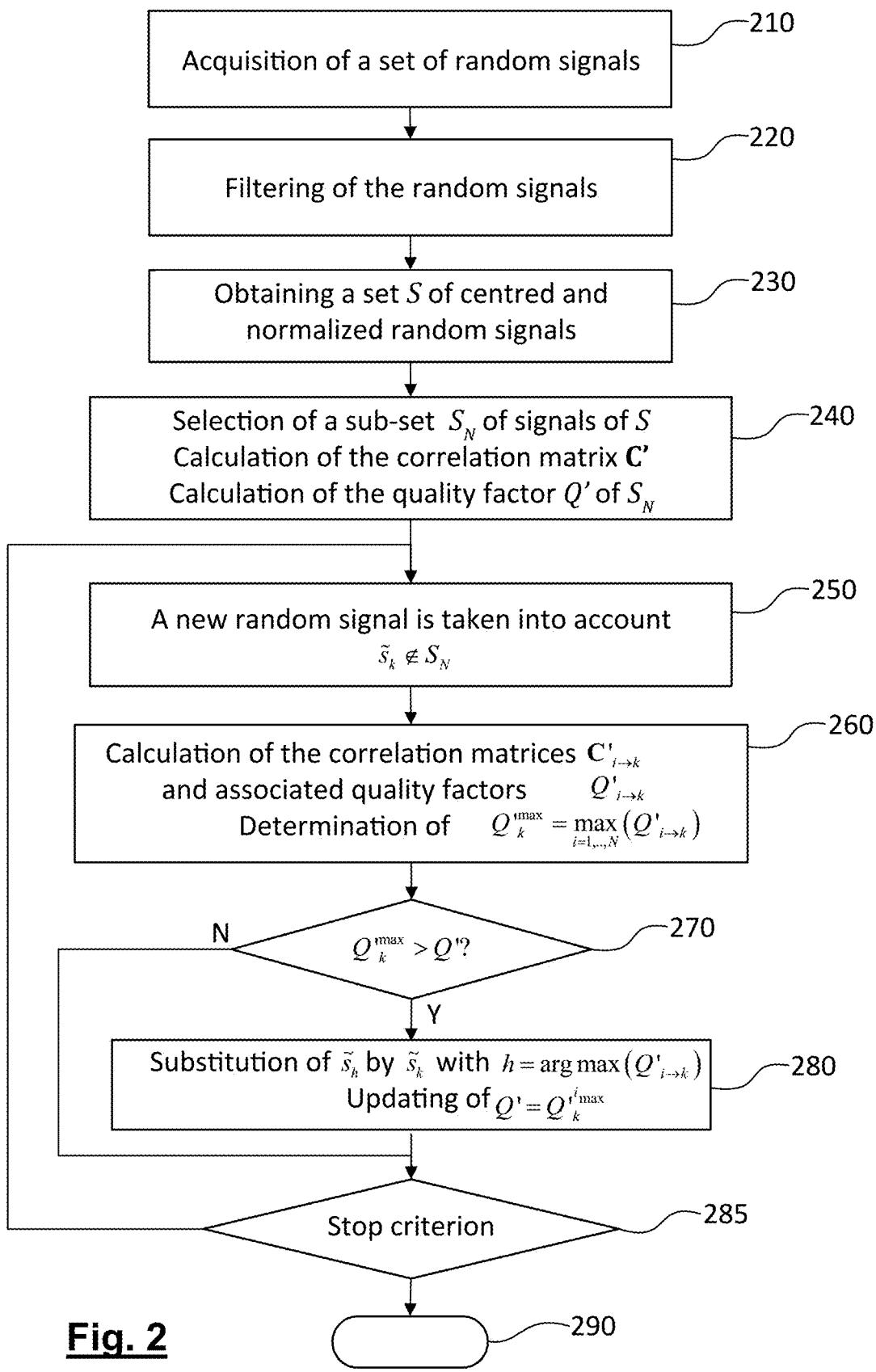
FIG. 2 schematically represents a method for constructing a coding dictionary by means of random acoustic signals according to a second embodiment of the invention.

FIG. 2 schematically represents a method for constructing a coding dictionary by means of random acoustic signals according to a second embodiment of the invention.

The steps 210 and 220 of acquisition and filtering of a set of random signals are identical to steps 110 and 120 of FIG. 1 and will thus not be described again.

At step 230, from each signal is subtracted its average so as to obtain a set of centred random signals, $\bar{s}_i$. However, unlike the first embodiment, the random signals are not here energy normalized. Optionally, the signals of energy below a predetermined threshold $E_{Th}$ could however be eliminated. A set S of random signals is eventually obtained.

At step 240, a sub-set $S_N$ of S constituted of N centred random signals $\bar{s}_i$, i=1, ..., N is arbitrarily selected and the correlation matrix of these signals is calculated. The elements of this correlation matrix are given by:

$$C'_{ij} = \sum_{\ell=1}^{L} \bar{s}_i(\ell)\bar{s}_j(\ell) \quad (7)$$

Unlike the first embodiment, the elements of the diagonal are not identical. The quality factor of the correlation matrix is next calculated, that is to say, in an equivalent manner, the quality factor of the set $S_N$.

In this embodiment, the quality factor may be calculated as follows:

$$Q' = \frac{\min_i(|C'_{ii}|)}{\min_{\substack{i,j \\ i \neq j}}(|C'_{ij}|)} \quad (8)$$

or, alternatively:

$$Q' = \min_i\left(\frac{|C'_{ii}|}{\max_{j \neq i}(|C'_{ij}|)}\right) \quad (9)$$

or even:

$$Q' = \frac{moy_i(|C'_{ii}|)}{moy_{\substack{i,j \\ i \neq j}}(|C'_{ij}|)} \quad (10)$$

As in the first embodiment, the quality factor Q' reflects the proximity of the correlation matrix to a diagonal matrix.

An iterative loop is next entered into, the steps 250 to 285 being identical to the steps 150 to 185 described previously with the sole difference that the quality factor, Q', is calculated using one of the expressions (7) to (9).

When the stop criterion is met, that is to say when the set S is exhausted or when, by successive substitutions, a sub-set $S_N$ has been found of which the quality factor is below a predetermined threshold value $Q'_{Th}$, the resulting sub-set $S_N$ is the sought after coding dictionary.

Figure 3:
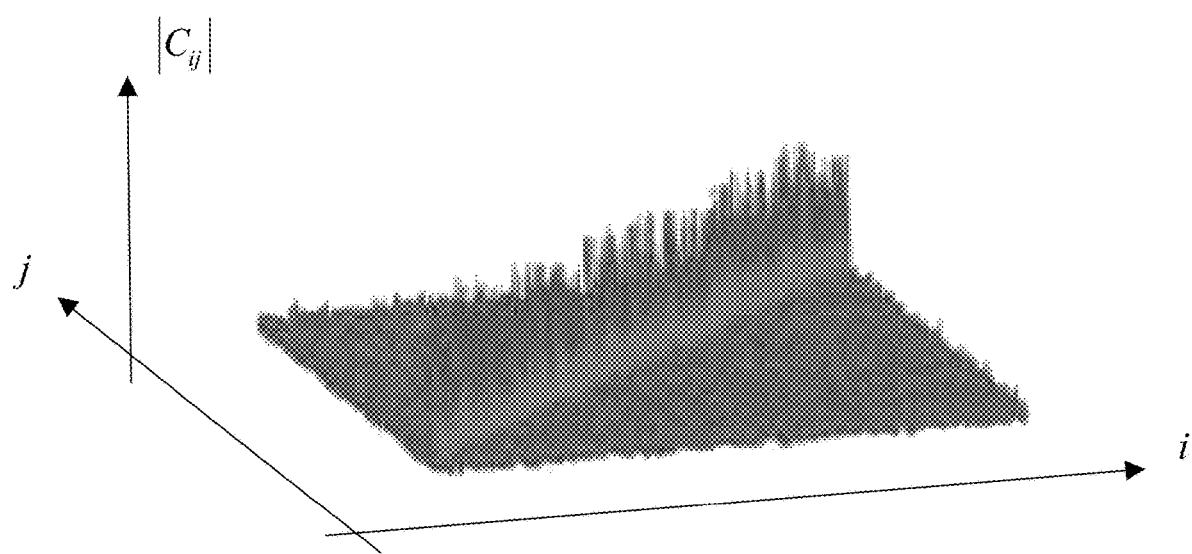
FIG. 3 represents an autocorrelation matrix of the random acoustic signals used in the coding of FIG. 2.

FIG. 3 represents the elements of a correlation matrix of random acoustic signals of a coding dictionary constructed according to the method of FIG. 2. More specifically, the absolute values $|C'_{ij}|$ of the correlation coefficients of the random acoustic signals of the dictionary $S_N$ are here represented, with N=256. It may be observed that the correlation coefficients of the main diagonal, that is to say the energies of the different random signals, are substantially higher than the out-of-diagonal correlation coefficients.

Figure 4:
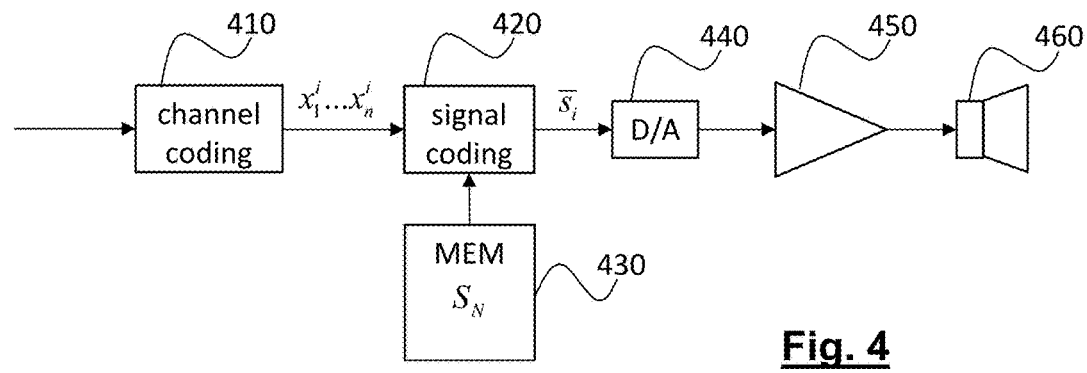
FIG. 4 schematically represents a method for transmitting information symbols coded by means of random acoustic signals, according to an embodiment of the invention.

FIG. 4 schematically represents a method for transmitting information symbols by means of random acoustic signals, according to an embodiment of the invention.

It is assumed that a coding dictionary according to the method of FIG. 1 or FIG. 2 has been generated beforehand, in other words that a set $S_N$ of random acoustic signals is available.

The words to transmit are optionally coded at 410 by means of a channel coding, for example a BCH or Reed-Solomon type block coding. If need be, a CRC code could also be added thereto, in a manner known per se. The blocks thereby coded by the channel coding and/or CRC coding are next divided into words of size$_n$ and consequently symbols of an alphabet A of cardinal $N=2^n$.

At each word of n bits, $x_1^i \ldots x_n^j$, the random signal of $S_N$ that is associated therewith in a one-to-one manner is read at 420 in the memory 430. This signal is next converted into an analogue signal at 440 then amplified at 450 before being transmitted by a transducer at 460 (loud speaker or piezoelectric transducer for example).

Thus, a sequence of words to transmit is transformed into an acoustic signal constituted by a sequence of random acoustic signals of $S_N$.

Alternatively, several words, i.e. several symbols of the alphabet A, could be transmitted simultaneously on the transmission channel. In this case, the acoustic signal transmitted during a word period will be simply constituted by the sum of the random acoustic signals associated with these different words.

Figure 5:
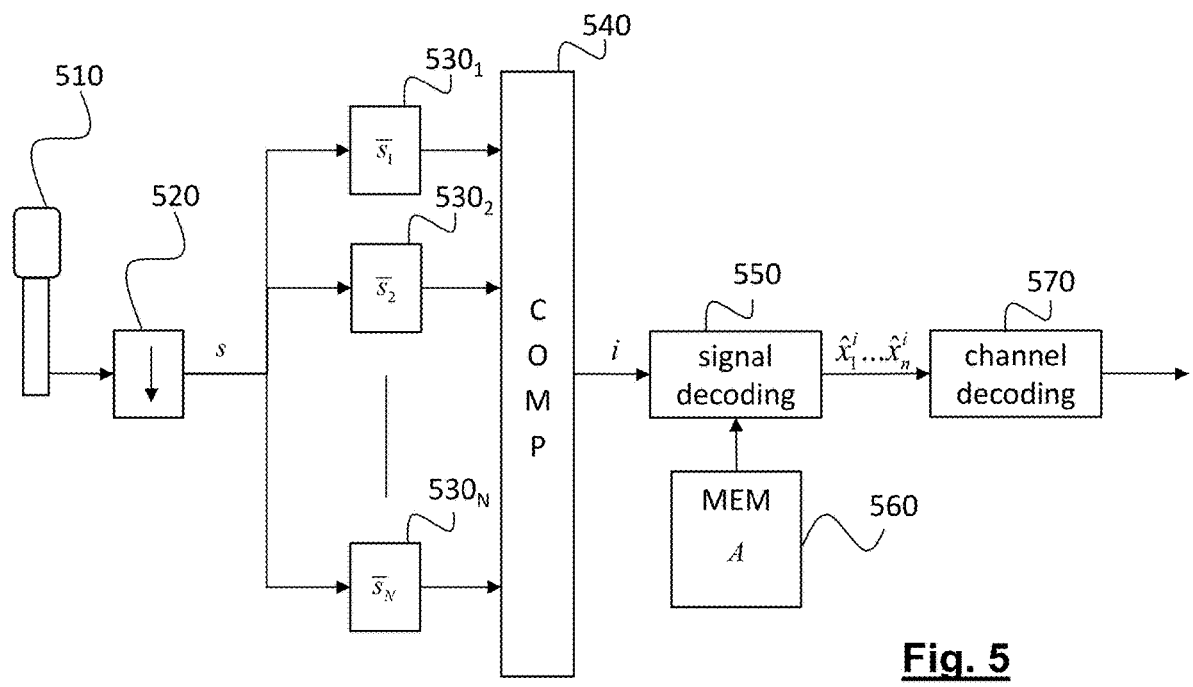
FIG. 5 schematically represents a method for receiving a random acoustic signal transmitted by the transmission method of FIG. 4.

FIG. 5 schematically represents a method for receiving an acoustic signal transmitted by the method for transmitting of FIG. 4.

The acoustic signal received by the transducer 510 is converted into an electrical signal which, if need be, is amplified (step not represented) then sampled at 520 at the Nyquist frequency. The sequence of samples thereby obtained is correlated in a battery of correlators in parallel 530$_1$, ..., 530$_N$ with the base random signals $\bar{s}_i$, i=1, ..., N (or $\tilde{s}_i$, i=1, ..., N in the second embodiment) of the dictionary $S_N$.

The correlators may be realised for example in the form of filters matched to the base random signals $\bar{s}_i$, i=1, ..., N (or $\tilde{s}_i$ i=1, ..., N in the second embodiment).

It will firstly be assumed that the transmission takes place in a sequential manner and that the correlators are synchronised with the transitions between successive words. It could notably be provided to transmit a pilot sequence as a preamble (for example a frame header) as a preamble of the payload, enabling the correlators to become synchronised with the word rhythm 1/T.

The correlation results at the output of the different correlators are compared with each other at 540, at the end of each period T. The index i of the signal $\bar{s}_i$ ($\tilde{s}_i$) corresponding to the highest correlation result in absolute value gives the index of the symbol of the alphabet A that has been transmitted. In practice, the index i is used at 550 as address element to read a memory 560 in which the words $x_1^j \ldots x_n^j$ of the alphabet A are stored.

The word of n bits read at this address, $\hat{x}_1^j \ldots \hat{x}_n^i$, is supplied to a channel decoder 570. The channel decoder concatenates the consecutive words to form blocks and carries out a channel decoding of these blocks. Those skilled in the art will understand that the channel decoding will make it possible to correct certain errors that are able to affect the transmitted blocks and that the calculation of the CRC will make it possible to determine if these blocks have been correctly decoded.

According to an alternative, several words may be transmitted simultaneously on the transmission channel. In this case, the correlation results are not compared with each other (in absolute value) but with a predetermined threshold value. The outputs of the correlators then give the indices of the words of the alphabet A that have been transmitted. In the same way, after concatenation of the words into blocks, a channel decoding of the blocks may next be carried out.

Numerous other alternatives could be envisaged by those skilled in the art without going beyond the scope of the present invention. For example, at the level of the transmission, it could be possible to provide that the random signals are used to modulate a carrier or a plurality of sub-carriers before the amplification step. In a symmetrical manner, the signal received by the acoustic transducer could undergo a corresponding demodulation before being correlated by the battery of correlators.

Due to the random nature of the acoustic signals, it is difficult for a third party listening to the channel to decode them to obtain the transmitted information symbols. Moreover, a plurality of sets $S_N$ could be provided at the transmission side and at the reception side, these sets being used according to a predetermined sequence. Alternatively, the switching from one set $S_N$ to another could be commanded by a control word transmitted on the acoustic channel or instead on an auxiliary channel.

What is claimed is:

1. Method for coding information symbols belonging to an alphabet by means of acoustic signals, wherein:
   (a) a set of random signals is acquired and they are filtered by a filter of interest having for response the response of the transmission channel on which these signals are intended to be transmitted;
   (b) sub-sets of N random signals thereby filtered of said set are selected and, for each sub-set, a correlation matrix of the signals thereby selected is calculated;
   (c) the sub-set of N signals corresponding to the correlation matrix the closest to a diagonal matrix is retained as coding dictionary;
   (d) each information symbol of the alphabet is coded by a random signal of the dictionary, said random signal of the dictionary being transformed into an acoustic signal by a transducer.

2. Method for coding according to claim 1, wherein said random signals are acquired by a random generator using thermal noise or ground noise.

3. Method for coding according to claim 1, wherein at step (c):
   (c1) a new random signal belonging to said set is successively substituted by one of the random signals of a first selected sub-set of signals;
   (c2) the correlation matrix of the random signals is calculated for each of the sub-sets thereby substituted and a quality factor characterising the proximity of the correlation matrix to a diagonal matrix is deduced therefrom;
   the steps (c1) and (c2) being repeated as long as the random signals of said set have not been exhausted and/or the quality factor is below a predetermined threshold value.

4. Method for coding according to claim 1, wherein, prior to step (b), from each random signal is subtracted its average so that said random signals are centred.

5. Method for coding according to claim 4, wherein the quality factor is calculated with a formula $$Q' = \frac{\min_i(|C'_{ii}|)}{\min_{\substack{i,j \\ i \neq j}}(|C'_{ij}|)} \text{ or } Q' = \min_i\left(\frac{|C'_{ii}|}{\max_{j \neq i}(|C'_{ij}|)}\right)$$

or instead $$Q' = \frac{moy_i(|C'_{ii}|)}{moy_{\substack{i,j \\ i \neq j}}(|C'_{ij}|)}$$

where the coefficients $C'_{ij}$ are the elements of the correlation matrix and where min, max and moy signify respectively the minimum value, the maximum value and the average value.

6. Method for coding according to claim 4, wherein, prior to step (b), the energy of the centred random signals is normalized so as to obtain normalized random signals all having a same average energy per sample.

7. Method for coding according to claim 6, wherein the quality factor is calculated with a formula $$Q = \frac{E_0}{\max_{\substack{i,j \\ i \neq j}}(|C_{ij}|)} \text{ or } Q = \frac{E_0}{moy_{\substack{i,j \\ i \neq j}}(|C_{ij}|)}$$

or instead $$Q = \frac{E_0}{\sum_{\substack{i,j \\ i \neq j}} |C_{ij}|}$$

where the coefficients $C_{ij}$ are the elements of the correlation matrix and $E_0$ is said average energy per sample of the random signals and where min, max and moy signify respectively the minimum value, the maximum value and the average value.

8. Method for transmitting information symbols belonging to an alphabet by acoustic signals, wherein said symbols are coded by the method for coding by acoustic signals according to claim 1, the acoustic signals corresponding to successive information symbols being transmitted sequentially on the transmission channel.

9. Method for transmitting information symbols belonging to an alphabet by acoustic signals, wherein said symbols are coded by the method for coding according to claim 1, a plurality of acoustic signals corresponding to different information symbols being transmitted simultaneously on the transmission channel.

10. Method for transmitting information symbols according to claim 8, wherein a channel coding of blocks of said symbols is carried out prior to their coding by acoustic signals.

11. Method for receiving information symbols transmitted by the method for transmitting of claim 8, wherein the acoustic signal received during a symbol time is transformed into an electrical signal by a transducer, then correlated with each of the random signals of the coding dictionary to provide a plurality of correlation results, the highest correlation result in absolute value providing the index of a symbol received during said symbol time.

12. Method for receiving information symbols transmitted by the method for transmitting of claim 9, wherein the acoustic signal received during a symbol time is transformed into an electrical signal by a transducer, then correlated with each of the random signals of the coding dictionary to provide a plurality of correlation results, the correlation results above, in absolute value, a predetermined threshold value providing the indices of the symbols received during said symbol time.

13. Method for receiving information symbols transmitted by the method for transmitting of claim 10, wherein the acoustic signal received during a symbol time is transformed into an electrical signal by a transducer, then correlated with each of the random signals of the coding dictionary to provide a plurality of correlation results, the correlation results above, in absolute value, a predetermined threshold value providing the indices of the symbols received during said symbol time, the blocks of symbols received next being subjected to a channel decoding.

\* \* \* \* \*